May 22, 1951      T. G. CUSTIN      2,554,172

LINEAR SWEEP WAVE GENERATOR

Filed March 6, 1948

Inventor:
Thomas G. Custin,
by *Merton D. Moore*
His Attorney.

Patented May 22, 1951

2,554,172

UNITED STATES PATENT OFFICE 2,554,172

LINEAR SWEEP WAVE GENERATOR

Thomas G. Custin, Syracuse, N. Y., assignor to General Electric Company, a corporation of New York Application March 6, 1948, Serial No. 13,511

4 Claims. (Cl. 250—36)

My invention relates to electric wave generators, and more particularly to such generators as may be employed to produce sweep waves characterized by linearly rising waveform.

In the operation of cathode ray devices, such as television receivers and the like, it is necessary to provide a sweep voltage which increases uniformly with time, in order to achieve constant velocity motion of the electron beam across the screen. Furthermore, this sweep voltage must be characterized by a high degree of linearity in order that the image appearing on the cathode ray screen may be an accurate reproduction of the impressed signal. Such a sweep voltage is commonly termed as a saw-tooth voltage. It is a primary object of my invention to provide an improved generator for producing a sweep voltage having a highly linear saw-tooth waveform.

In such systems as have been used previously to provide saw-tooth sweep voltages, it has been customary to employ a condenser adapted to be charged at a relatively low rate from a direct voltage source in series with a resistance. The output of such a system is usually characterized by a somewhat non-linear waveform, since the condenser is charged exponentially. It is an object of my invention to provide a system for producing an output voltage of linear waveform by way of charging a condenser at a substantially constant rate.

In accordance with my invention, energy storage means such as a capacitance for example, is charged from a source of unidirectional potential through a constant current device and is discharged through an auxiliary electron tube. I provide as a constant current device an electron discharge device having a screen grid. By maintaining the screen-to-cathode voltage of this electron discharge device substantially constant, the device is made to draw constant current. As a result, the energy storage capacitance is made to charge at a linear rate, and a linear saw-tooth voltage output is obtained.

For additional objects and advantages, and for a better understanding of the invention, attention is now directed to the following description and accompanying drawings, and also to the appended claims in which the features of the invention believed to be novel are particularly pointed out.

Figure 1:
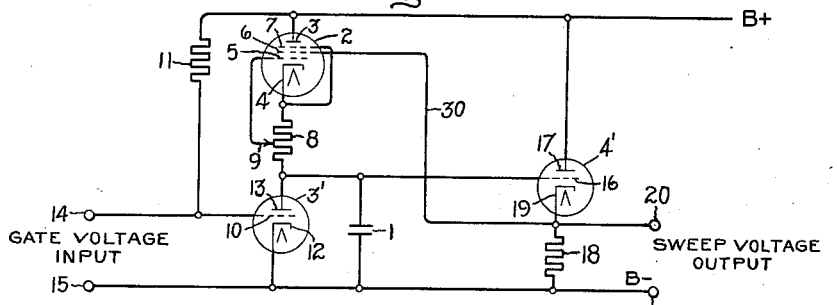
Fig. 1 is a schematic diagram of a saw-tooth voltage generator which suitably embodies my invention.

Referring to Fig. 1, there is shown in schematic form a circuit for providing a substantially linear saw-tooth voltage. Energy storage means, here shown as a capacitance 1, is charged from a source of unidirectional potential, conventionally designated by the symbol B+, through an electron discharge device 2. The discharge circuit for capacitance 1 comprises a second electron discharge device 3'. Linear saw-tooth voltage output is obtained across capacitance 1, and is supplied to an output circuit which comprises a third electron discharge device 4'.

Device 2 has been shown as a pentode having an anode 3, a cathode 4, a control electrode 5, a screen electrode 6, and a suppressor grid 7. Positive unidirectional operating potential is supplied to the anode 3 of device 2 from B+. The suppressor grid 7 of device 2 is directly connected to the cathode 4 in conventional manner. The cathode 4 of device 2 is connected through a load resistance 8 and capacitance 1 to the low potential side of the operating potential source, conventionally designated by the symbol B—. The control electrode 5 of device 2 is connected to a variable tap 9 on load resistance 8. Thus, the charging circuit for energy storage means 1 may be traced from B+, through discharge device 2, load resistance 8, and capacitance 1 in series, to B—.

Electron discharge device 3' is here shown as a triode which is normally maintained in a conductive state by virtue of bias voltage supplied to a control electrode 10 through a voltage dropping resistance 11 from B+. The cathode 12 of device 3' is directly connected to B—. The anode 13 of device 3' is connected to the high potential side of capacitance 1, and to the cathode 4 of device 2 through load resistance 8. Input terminals 14 and 15 are provided between the control electrode 13 and the cathode 12 of device 3'. Thus, the discharge circuit for energy storage means 1 comprises electron discharge device 3'.

The voltage appearing across capacitance 1 is supplied to the control electrode 16 of output tube 4'. The anode 17 of tube 4' is directly connected to B+, and a load resistance 18 is provided between the cathode 19 of device 4' and B—. The screen electrode 6 of device 2 is directly connected to the cathode 19 of device 4' through conductor 30. Output terminals 20 and 21 are provided across load resistance 18.

In operation, device 3' is normally maintained in a conductive state by virtue of the connection between control electrode 10 and B+. Consequently, the potential difference appearing across capacitance 1 is normally quite small. When a negative gate voltage pulse is supplied to input terminals 14 and 15 from a blocking oscillator or other suitable source, not shown, device 3' is biased beyond cutoff to a non-conductive state, and capacitance 1 commences to acquire a positive charge. In order to insure that capacitance 1 charges at a linear rate, a pentode 2 is employed as a constant current device in the charging circuit. As is well known, a pentode operates as a constant current device only when the screen-to-cathode voltage is maintained substantially constant. It will be seen that both the potential appearing at the screen electrode 6 of pentode 2 and the potential appearing at the cathode 4 undergo similar variations, due to the connection of the load resistance 18 in the cathode circuit of device 4'. Consequently, the screen-to-cathode voltage of device 2 is maintained substantially constant, and capacitance 1 is made to charge at a substantially linear rate. The output tube 4' serves as an amplifier, and a corresponding uniformly-rising voltage appears between the output terminals 20 and 21.

When the negative gate voltage is removed from the input terminals 14 and 15, device 3' again conducts, and capacitance 1 is discharged therethrough. Furthermore, the rate of discharge is very rapid with respect to the charging rate. The cycle is then repeated with the result that a substantially saw-tooth voltage appears at the output terminals 20 and 21.

Figure 2:
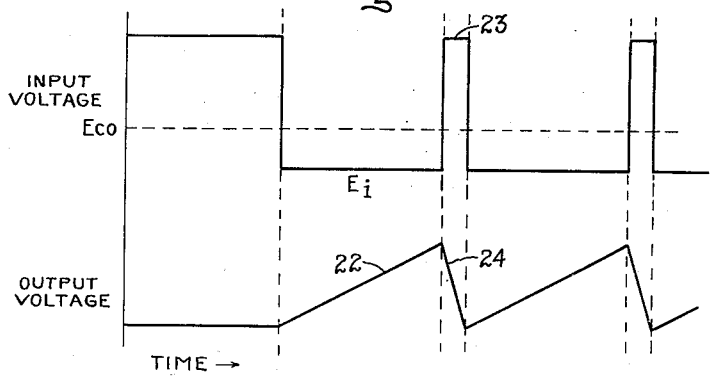
Fig. 2 is a graphical representation of input and output voltage waveforms in the circuit of Fig. 1.

Fig. 2 is a graphical representation, on a common time scale, of the waveforms of the input and output voltages of the circuit of Fig. 1. The input voltage $E_i$ is shown as a negative gate voltage composed of substantially square pulses, such as that which may be obtained from a blocking oscillator or multivibrator. When the gate voltage $E_i$ is more negative than the cutoff voltage $E_{co}$ of device 3', capacitance 1 is charged, and the output voltage appearing at terminals 20 and 21 rises at a linear rate as shown at 22. When the negative gate voltage is removed, as at 23, capacitance 1 discharges through device 3' at a relative rapid rate as shown at 24.

Figure 3:
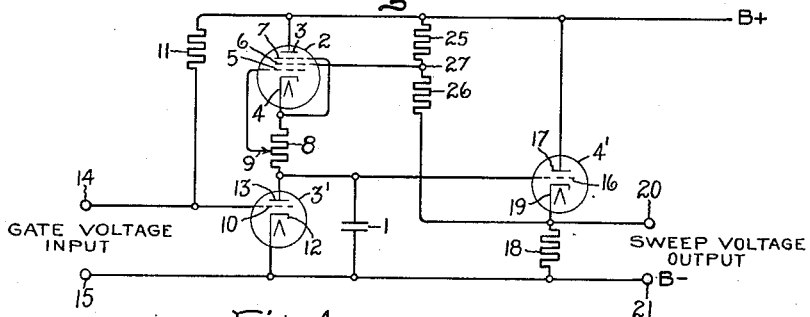
Fig. 3 is a schematic diagram of a modification of the circuit of Fig. 1.

Referring to Fig. 3, a modification of circuit of Fig. 1 is shown wherein greater output voltage amplitude may be provided by virtue of a higher screen-to-cathode voltage of device 2. In this modification, a voltage divider is provided, comprising a pair of resistances 25 and 26 connected between B+ and the cathode 19 of device 4'. The screen electrode 6 of device 2 is connected to the junction 27 of resistances 25 and 26. Resistor 26 may also be bypassed for sweep frequencies by a suitable capacitor, not shown. In all other respects, the circuit of Fig. 3 is identical with that shown in Fig. 1. In this manner, by making resistances 25 and 26 very large in comparison with load resistance 18, so as not to bias device 4' beyond cutoff, higher screen-to-cathode voltage for device 2 is provided. It has also been found that resistance 25 must be greater in value than resistance 26 in order to insure the operation of device 2 as a constant current device.

Figure 4:
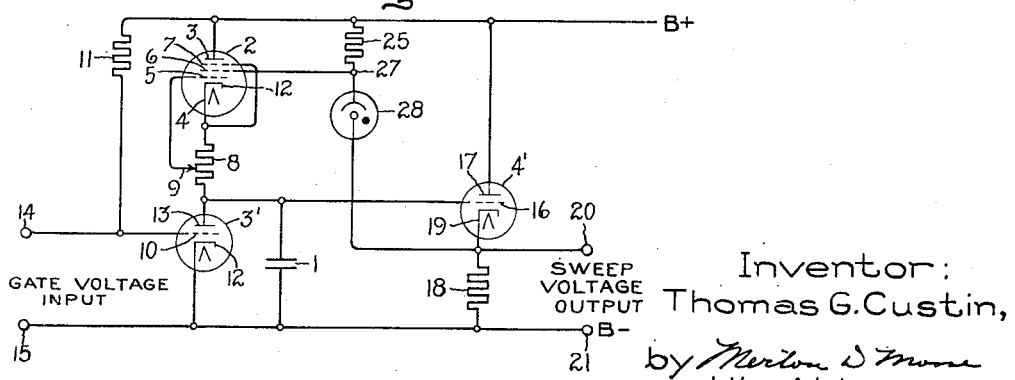
Fig. 4 is a circuit diagram of a further modification. In the several figures, like reference numerals signify like elements.

Referring to Fig. 4, a modification of the circuit of Fig. 3 is shown in which resistance 26 is replaced by a constant potential device 28. In all other respects, the circuit of Fig. 4 is identical with that of Fig. 3. In this modification, the entire variation in voltage across the voltage divider appears across resistor 25, and constant current operation of device 2 is insured.

While specific embodiments have been shown and described, it will of course be understood that various modifications may be made without departing from the invention. The appended claims are therefore intended to cover any such modifications within the true spirit and scope of the invention.

What I claim as new and desire to secure by Letters Patent of the United States is:

1. A generator for producing saw-tooth voltage waves comprising energy storage means, a charging circuit for said storage means serially comprising a source of unidirectional potential and the anode-cathode path of a first electron discharge device, said device also having a screen electrode, a discharge circuit for said storage means comprising a second electron discharge device having an anode-cathode path connected in circuit across said storage means, a source of negative gate voltage, said second device being normally maintained in a conductive state and being periodically rendered non-conductive by said gate voltage, an output circuit comprising a third electron discharge device having an anode circuit and a control electrode circuit, means for impressing anode operating potential across said anode circuit, an output load impedance common to said anode and control electrode circuits, means for impressing the voltage across said energy storage means upon said control electrode circuit, and means for impressing voltage variations across said impedance upon said screen electrode in a sense to assist in maintaining the current through said first device substantially constant.

2. A generator for producing saw-tooth voltage waves comprising energy storage means, a charging circuit for said storage means serially comprising a source of unidirectional potential and the anode-cathode path of a first electron discharge device, said device also having a screen electrode, a discharge circuit for said storage means comprising a second electron discharge device having an anode-cathode path connected in circuit across said storage means, a source of negative gate voltage, said second device being normally maintained in a conductive state and being periodically rendered non-conductive by said gate voltage, an output circuit comprising a third electron discharge device having an anode circuit and a control electrode circuit, means for impressing anode operating potential across said anode circuit, an output load impedance common to said anode and control electrode circuits, a voltage divider comprising a pair of resistances connected in series relation with said load impedance across said unidirectional potential source, said screen electrode being connected to the junction of said resistances, and means for impressing the voltage across said energy storage means upon said control electrode circuit.

3. A generator for producing saw-tooth voltage waves comprising energy storage means, a charging circuit for said storage means serially comprising a source of unidirectional potential and the anode-cathode path of a first electron discharge device, said device also having a screen electrode, a discharge circuit for said storage means comprising a second electron discharge device having an anode-cathode path connected in circuit across said storage means, a source of negative gate voltage, said second device being normally maintained in a conductive state and being periodically biased beyond cutoff by said gate voltage, an output circuit comprising a third electron discharge device having an anode circuit and a control electrode circuit, means for impressing anode operating potential across said anode circuit, an output load impedance common to said anode and control electrode circuits, a voltage divider comprising a resistance and a constant potential device connected in series relation between said cathode and the positive pole of said unidirectional potential source, said screen electrode being connected to the junction of said resistance and said constant potential device, and means for impressing the voltage across said energy storage means upon said control electrode circuit.

4. A sweep generator comprising a sweep capacitor, a source of unidirectional potential having positive and negative terminals, a pentode discharge device including a cathode, control grid, screen grid and anode, a charging circuit for said capacitor comprising a connection from said anode to said positive terminal and a connection from said cathode through said capacitor to said negative terminal, means biasing said control grid to render said device conducting, means normally providing a low impedance discharge path in shunt to said capacitor, means for interrupting said discharge path for a time interval, thereby to permit said capacitor to charge through said pentode, an output circuit comprising an electron discharge device having grid and anode circuits and an output load impedance common to said circuits, means for impressing the potential developed on said capacitor upon said grid circuit, and means for impressing voltage developed across said impedance between said screen grid and said negative terminal in a sense to assist in maintaining a substantially constant charging current during said interval.

THOMAS G. CUSTIN.

REFERENCES CITED

The following references are of record in the file of this patent:

UNITED STATES PATENTS

| Number | Name | Date |
|---|---|---|
| 2,232,076 | Newsam | Feb. 18, 1941 |
| 2,282,340 | Pieplow | May 12, 1942 |
| 2,412,063 | Rosentreter | Dec. 3, 1946 |
| 2,412,064 | Moe | Dec. 3, 1946 |
| 2,426,256 | Zenor | Aug. 26, 1947 |
| 2,439,324 | Walker | Apr. 6, 1948 |
| 2,453,787 | Downs, Jr. | Nov. 16, 1948 |